(12) United States Patent
Yan et al.

(10) Patent No.: US 10,747,826 B2
(45) Date of Patent: *Aug. 18, 2020

(54) INTERACTIVE CLOTHES SEARCHING IN ONLINE STORES

(71) Applicant: VISENZE PTE. LTD, Singapore (SG)

(72) Inventors: Shuicheng Yan, Singapore (SG); Zheng Song, Singapore (SG); Si Liu, Singapore (SG)

(73) Assignee: VISENZE PTE. LTD, Singapore (SG)

( * ) Notice: Subject to any disclaimer, the term of this patent is extended or adjusted under 35 U.S.C. 154(b) by 323 days.

This patent is subject to a terminal disclaimer.

(21) Appl. No.: 15/730,580

(22) Filed: Oct. 11, 2017

(65) Prior Publication Data

US 2018/0096069 A1 Apr. 5, 2018

Related U.S. Application Data

(63) Continuation of application No. 14/406,034, filed as application No. PCT/SG2013/000238 on Jun. 7, 2013, now Pat. No. 9,817,900.

(Continued)

(51) Int. Cl.
*G06F 16/951* (2019.01)
*G06N 20/00* (2019.01)
(Continued)

(52) U.S. Cl.
CPC ........... *G06F 16/951* (2019.01); *G06K 9/00* (2013.01); *G06K 9/6215* (2013.01);
(Continued)

(58) Field of Classification Search
USPC ........................................................ 706/12
See application file for complete search history.

(56) References Cited

U.S. PATENT DOCUMENTS

D724,325 S 3/2015 Klein et al.
D765,444 S 9/2016 Klein et al.
(Continued)

FOREIGN PATENT DOCUMENTS

CN 1738456 2/2006
CN 101819663 9/2010
(Continued)

OTHER PUBLICATIONS

A browsing approach to online photo search results David Edmundson; Gerald Schaefer 2013 IEEE International Conference on Signal Processing, Communication and Computing (ICSPCC 2013) Year: 2013 pp. 1-5, DOI: 10.1109/ICSPCC.2013.6664109 IEEE Conference Publications.

(Continued)

*Primary Examiner* — Michael B Holmes
(74) *Attorney, Agent, or Firm* — Kilpatrick Townsend and Stockton LLP

(57) ABSTRACT

A clothing search system provides a clothing search to users using a component-based image search. Retailer catalogs are analyzed to determine clothing components within clothing images. Features associated with the components are determined. When a user requests a clothing search, the clothing search system selects clothing based on the components and features requested by the user. The user may also provide an image to the clothing search system. The clothing search system determines components and features of the image and identifies clothing with matching components.

19 Claims, 6 Drawing Sheets

Related U.S. Application Data

(60) Provisional application No. 61/657,146, filed on Jun. 8, 2012.

(51) Int. Cl.
    *G06Q 30/06*     (2012.01)
    *G06K 9/00*     (2006.01)
    *G06N 5/00*     (2006.01)
    *G06K 9/62*     (2006.01)

(52) U.S. Cl.
    CPC ........... *G06K 9/6256* (2013.01); *G06N 5/003* (2013.01); *G06N 20/00* (2019.01); *G06Q 30/0603* (2013.01); *G06Q 30/0627* (2013.01)

(56) References Cited

U.S. PATENT DOCUMENTS

| | | | |
|---|---|---|---|
| 9,817,900 B2* | 11/2017 | Yan | G06K 9/00 |
| 2008/0163184 A1 | 7/2008 | Kanade | |
| 2009/0019053 A1* | 1/2009 | Burgess | G06Q 30/02 |
| 2010/0306282 A1* | 12/2010 | Bennett | G06N 5/02 |
| | | | 707/803 |
| 2011/0058028 A1 | 3/2011 | Sakai et al. | |
| 2015/0127592 A1 | 5/2015 | Yan et al. | |

FOREIGN PATENT DOCUMENTS

| | | |
|---|---|---|
| CN | 101853299 | 10/2010 |
| JP | 2009251850 | 10/2009 |
| JP | 2011081763 | 4/2011 |
| WO | 2001064002 | 9/2001 |
| WO | 2002079942 | 10/2002 |

OTHER PUBLICATIONS

Personal Clothing Retrieval on Photo Collections by Color and Attributes Xianwang Wang; Tong Zhang; Daniel R. Tretter; Qian Lin IEEE Transactions on Multimedia Year: 2013, vol. 15, Issue: 8 pp. 2035-2045, DOI: 10.1109/TMM.2013.2279658 IEEE Journals & Magazines.

Mobile visual clothing search George A. Cushen; Mark S. Nixon 2013 IEEE International Conference on Multimedia and Expo Workshops (ICMEW) Year: 2013 pp. 1-6, DOI: 10.1109/ICMEW.2013.6618404 IEEE Conference Publications.

Keyword query approach over RDF data based on tree template Qiang Sima; Huiying Li 2016 IEEE International Conference on Big Data Analysis (ICBDA) Year: 2016 pp. 1-6, DOI: 10.1109/ICBDA.2016.7509797 IEEE Conference Publications.

JP2015-515985 , "Office Action", dated Feb. 29, 2016.

PCT Application No. PCT/SG2013/000238, International Search Report and Written Opinion, dated Jul. 12, 2013.

* cited by examiner

Annotated Clothes Attributes

FIG. 6

INTERACTIVE CLOTHES SEARCHING IN ONLINE STORES

CROSS REFERENCES TO RELATED APPLICATIONS

This application is a continuation of U.S. patent application Ser. No. 14/406,034, filed Dec. 5, 2014, now U.S. Pat. No. 9,817,900, issued Nov. 14, 2017, which is the U.S. national stage of International Patent Application No. PCT/SG2013/000238, filed Jun. 7, 2013, which claims the benefit of priority to U.S. Provisional Application No. 61/657,146, filed Jun. 8, 2012, the disclosures of all of which are incorporated herein by reference in their entirety.

BACKGROUND

This invention relates generally to online consumer products search and particular to interactive online content-based image search and retrieval of clothes in online stores.

Online clothing shopping is becoming an increasingly popular shopping model. In many online shopping web sites, customers can search for clothing using keywords, such as by such as "black, sleeveless cocktail dress." These searches typically provide a set of search results to the user based on the keywords of the search and keywords associated with clothing at the online shopping website.

However, this search limits the user to keywords the user may consider, and often requires the user to sort through many search results to find an item of interest to the user. Fashion is a highly visual art, and the conversion of a fashionable look into keywords frequently misses characteristics of a desired look. Moreover, a user frequently wants to find clothing similar to a picture seen by the user or to a scene or person the user is viewing in person. Thus, there is a need for a system that is capable of identifying similar clothing based on a photo.

SUMMARY

The system is designed for many online clothes stores nowadays, to facilitate buyers efficiently finding their favorite clothes. The clothes retailers first provide clear photos of the clothes sold in their stores and a database of these clothes are built. In addition, the system can automatically locate key parts of the clothes and recognize their designs (color, pattern, collar, sleeves, and trousers/skirt styles) and save them in the database together with the clothes photos.

The system then provide a web interface such that the buyers can find their favorite clothes, with a query photo of their favorite clothes, which might be found on the web or captured by camera on street. In the same way with the clothes shop dataset, the system recognizes the design of the query clothes and retrieves the most similar online commodities saved in the database.

The system can also interact with the buyers if they have further demands on their favorite clothes. In this case, the system can let the buyers to choose which part/design the buyers like most in the query clothes. And the system will revise the result accordingly to meet the demand.

In one embodiment, a method is provided for interactively searching clothes in online stores, the method comprising receiving a plurality of photos of articles of clothing sold by a seller; for each photo of an article of clothing, automatically detecting a plurality of feature components associated with the article of clothing; receiving a query from a user for an article of clothing; and retrieving one or more articles of clothing that match the plurality of feature components of the queried article of clothing.

In a further embodiment, the method further comprises building the database for storing a plurality of photos of articles of clothing and their associated feature components from a plurality of sellers.

In a further embodiment, the plurality of feature components associated with the article of clothing comprise: type of the article of clothing; color of the article of clothing; style of the article of clothing; location of each component of the article of clothing; description of each component; and design information of the article of clothing.

In a further embodiment automatically detecting the plurality of feature components associated with the article of clothing comprises training a tree-structure human parsing model to locate the plurality of feature components of the articles of clothing; and locating and describing the plurality of feature components of the article of clothing in the articles of clothing. In an additional embodiment, training the tree-structure human parsing model comprises training a plurality of shape templates of individual human body parts based on a large amount of pre-labeled training samples for human parsing; and training tree-structured combinations of human body parts subject to a large amount of pre-labeled training samples for human parsing.

In a further embodiment, the method further includes retrieving one or more articles of clothing comprises detecting a plurality of feature components from the queried article of clothing; and determining the relevancy of the detected feature components of the one or more articles of clothing.

In a further embodiment, the method further includes annotating the common clothing styles and storing the annotation with the identified articles of clothing; evaluating the plurality of feature components of the articles of clothing using the annotations of the common clothing styles; and searching for common clothing styles of among the plurality of articles of clothing stored in the database using the annotations of the common clothing styles.

In another embodiment, a non-transitory computer-readable storage medium stores executable computer program instructions for interactively searching clothes in online stores according to any of the above methods.

In another embodiment, a computing system includes a processor configured to execute any of the above methods.

In another embodiment, a non-transitory computer-readable storage medium stores executable computer program instructions for interactively searching clothes, wherein the computer program instructions comprise instructions for receiving a plurality of photos of articles of clothing sold by a seller; for each photo of an article of clothing, automatically detecting a plurality of feature components associated with the article of clothing receiving a query from a user for an article of clothing; and retrieving one or more clothes that matches the plurality of feature components of the queried article of clothing.

BRIEF DESCRIPTION OF THE DRAWINGS

FIG. 6 illustrates annotated clothing attributes according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Online clothing shopping is becoming an increasingly popular shopping model. This disclosure describes a clothing identification system that can select similar clothing based on an image captured by a user client, such as a photo of a person on the street or the selection of a photo from the internet. Similar clothing from online retailers or other databases is selected for presentation to the user.

Figure 1:
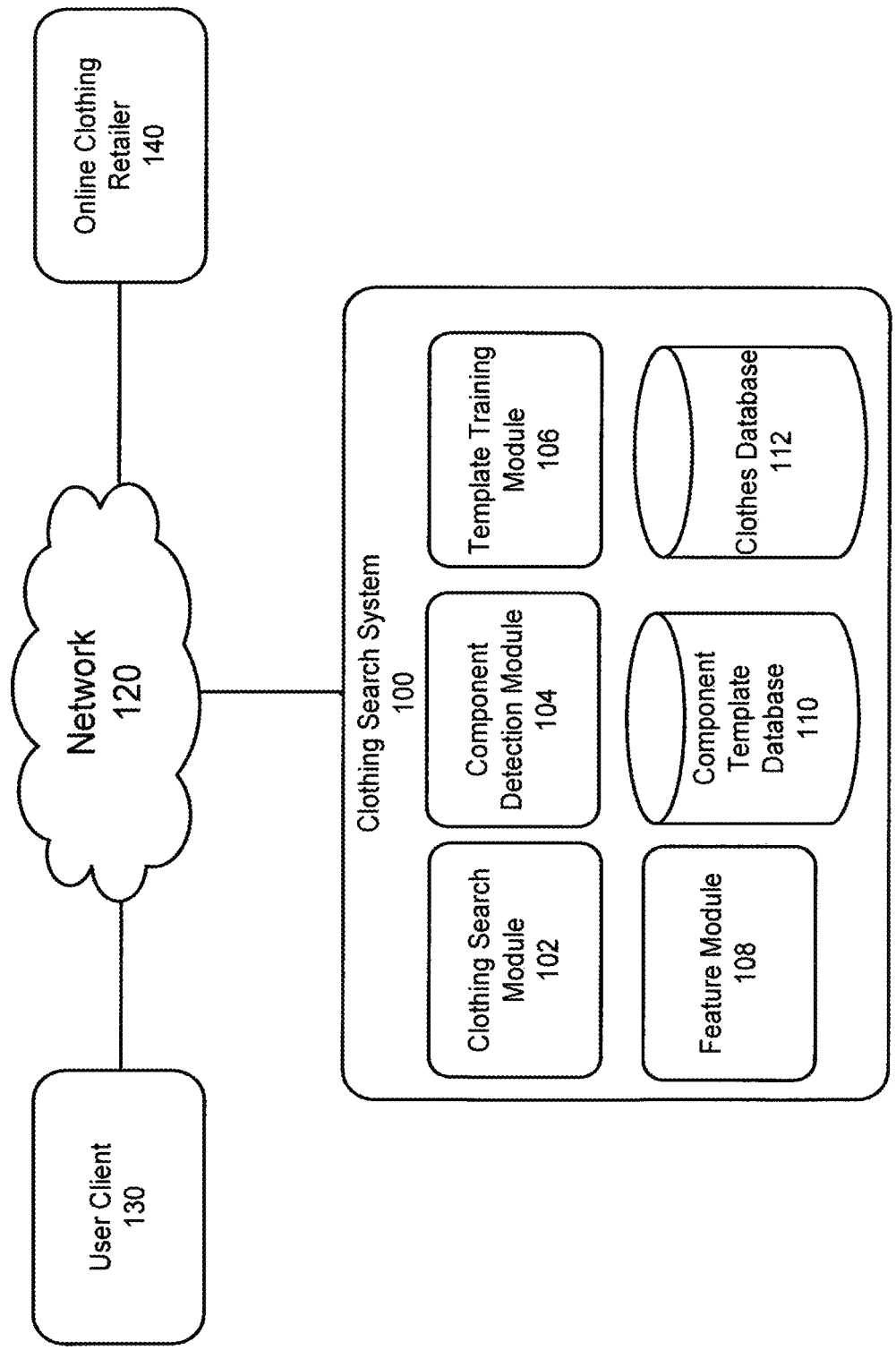
FIG. 1 is an environment for a clothing search system according to one embodiment.

FIG. 1 is an environment for a clothing search system according to one embodiment. A clothing search system 100 searching for and identifies clothing based on a selection of a component of clothing or based on an image of clothing. The clothing search system 100 is connected to a user client 130 and an online clothing retailer 140 through a network 120.

The user client 130 is a computing device operated by a user and is any suitable system for communicating with the clothing search system 100. The user client 130 may be a tablet computer, mobile device, desktop computer, or other computing system. The user client 130 provides a display to the user and receives input from the user for transmission to the clothing search system 100. The user client 130 may also include a camera or other imaging device for capturing an image. The image captured by the camera or otherwise accessible by the user client 130 is transmitted to the clothing search system 100 for selection of similar clothing. An image may also be selected by other means, such as by selecting an image from a network such as the internet.

The online clothing retailer 140 maintains a database and other systems for selling clothing online. The clothing at the online clothing retailer 140 is associated with at least one image and may be associated with additional data. The additional data may include keywords associated with the clothing and may further include a style, type of clothing, description of the clothing, and design information. The clothing search system 100 may connect with multiple online clothing retailers 140 and access clothing stored in a clothing database at each online clothing retailer 140. When users receive search results of interest to the user, the user may access the online clothing retailer 140 to purchase clothing of interest to the user.

The clothing search system 100 includes various modules and databases for receiving and processing information from the user client 130 and online clothing retailer 140 to provide clothing suggestions to the user of the user client 130. The clothing search system 100 is a visual-based recognition system that receives photos with clothes/persons and outputs the locations and features descriptions of the clothes components. Thus, the clothing search system 100 receives the images of clothing from the online clothing retailer 140 and analyzes the images to determine component parts of the clothes as well as style and other features. The component parts indicate certain portions of the image corresponding to aspects of the images, such as neck, sleeve, shoulder, skirt, etc. This allows the image to be analyzed as a composition of several components. For example, an image may be recognized as having a neck, shoulder, waist, but no sleeves. The components are used to assist in matching based on the components. Users may select a component and search for other clothing with a matching component with similar features. The components used for matching can be based on user selection, or can be based on components in an image provided by the user. The clothing search system 100 includes a clothing search module 102, a component detection module 104, a template training module 106, a feature module 108, and data storage elements such as a component template database 110 and a clothes database 112. The modules and other parts of clothing search system 100 illustrated in FIG. 1 may be accompanied by additional or fewer modules in various embodiments and is not limited to the example of FIG. 1.

The component template database 110 maintains a tree-based template for various types of components. The template may also be termed a classifier, and determines whether a portion of an image is recognized as the image type of the template. For example an image is provided to a "shoulder" template, and the template determines whether a portion of the image includes a "shoulder" and what portion of the image includes a shoulder. The template is structured as a tree that uses shape-based components of the image. Specifically, one embodiment uses a histogram of oriented gradients (HOG) of an image to determine component types. Various photos may capture a "shoulder" component from different views and with different characteristics, for example from different angles, such as the front, side, back, or above. Each of these different angles may provide different characteristics in the images. By using a tree-based template, each set of common characteristics can be treated as a branch in the tree and therefore allow identification of the component quickly and without interference from the features of other types of "shoulder" views.

The template for a component is created or trained by the template training module 106. In detail, the component detection system trains shape templates and component combine rules based on a labeled human parsing dataset and the shape description feature. The feature used to train the component detection method is the same as the method for identifying the component as described above. As such, in one embodiment a histogram of oriented gradient features is used. In other embodiments, other feature types may be used to define the labeled dataset. In the one embodiment, the algorithm trains templates on the BUFFY upper body dataset and PARSE full body dataset with Histogram of Oriented Gradient (HOG) features.

The component detection module 104 applies the component templates in the component template database 110 to an image to determine the clothing components within the image. The image processed by the component detection module 104 may be obtained from the user client 130 or may be provided by the online clothing retailer 140. The various components may be provided to the feature module 108 or the clothing search module 102.

The feature module 108 extracts features related to the components detected by the component detection module. For clothing in the online clothing retailer, the feature module 108 may access keywords, descriptions, styles, and other terms associated with the clothing in the online clothing retailer database. For components in the image, the feature module 108 accesses the portion of the image relating to each component and extracts features related to the component. The extracted features are used to determine the similarity of a component in one clothing item to the component in another clothing item. For example, a shoulder in one clothing item that is bright red and fully covers the shoulder is similar to another bright red full-coverage component on another piece of clothing. In one embodiment, the extracted features include a histogram of gradients, a color histogram, a color moment, local binary patterns and skin color. In other embodiments, any suitable features may be used that describe aspects of the identified components.

In additional embodiments, the keywords and other keywords, styles, and descriptions are also trained relative to the extracted features. The style and keywords of matching clothing or components may be used to suggest a style and keywords to associate with the query image.

The clothes database 112 maintains a database of clothing associated with online clothing retailers 140. The images of clothing at the online clothing retailer 140 are retrieved by the clothing search system and added to the clothing database 112. The component detection module 104 analyzes the clothing at the online clothing retailer 140 and adds the identified components to the clothes images, as well as features associated with the components of the images as identified by the feature module 108. In addition, the keywords, styles, and other aspects of the clothing stored at the online clothing retailer 140 are retrieved and associated with the clothes in the clothing database 112.

The clothing search module 102 receives a search request from the user client 130 and performs a search for similar or matching clothes on clothes database 112. When a new query photo is received by the clothing search module 102, the clothing search module provides the photo to the component detection module 104 to determine the clothing components in the photo. After determining the clothing components, the clothing components and the photo are provided to the feature module 108 to extract features associated with each clothing component as described above.

The clothing search module 102 queries the clothes database 112 to determine clothing that has the same components. The clothing search module 102 determines the clothing that has similar features by matching components with the image provided by the user and by matching the features associated with the components with the features of clothes in the clothes database 112. The clothing search module 102 determines a feature distance between the query image features and the features of the clothes in the database 112. The clothing search module 102 then retrieves the most similar items based on the total feature distance. In one embodiment, the user can select a favorite component of the image or otherwise indicate to weight a particular component highly. When the user selects a favorite component, the similarity measurement related to that component is weighted relative to the similarity for the other components. In this way, the clothing search module 102 provides a set of clothing from the online clothing retailer 140 that is similar in components and features to the clothing identified in the image provided by the user client 130. The clothing search module 102 provides a search result list to the user client 130 or provides a link or other pointer for the user client 130 to access the resulting clothing at the online clothing retailer 140.

Figure 2:
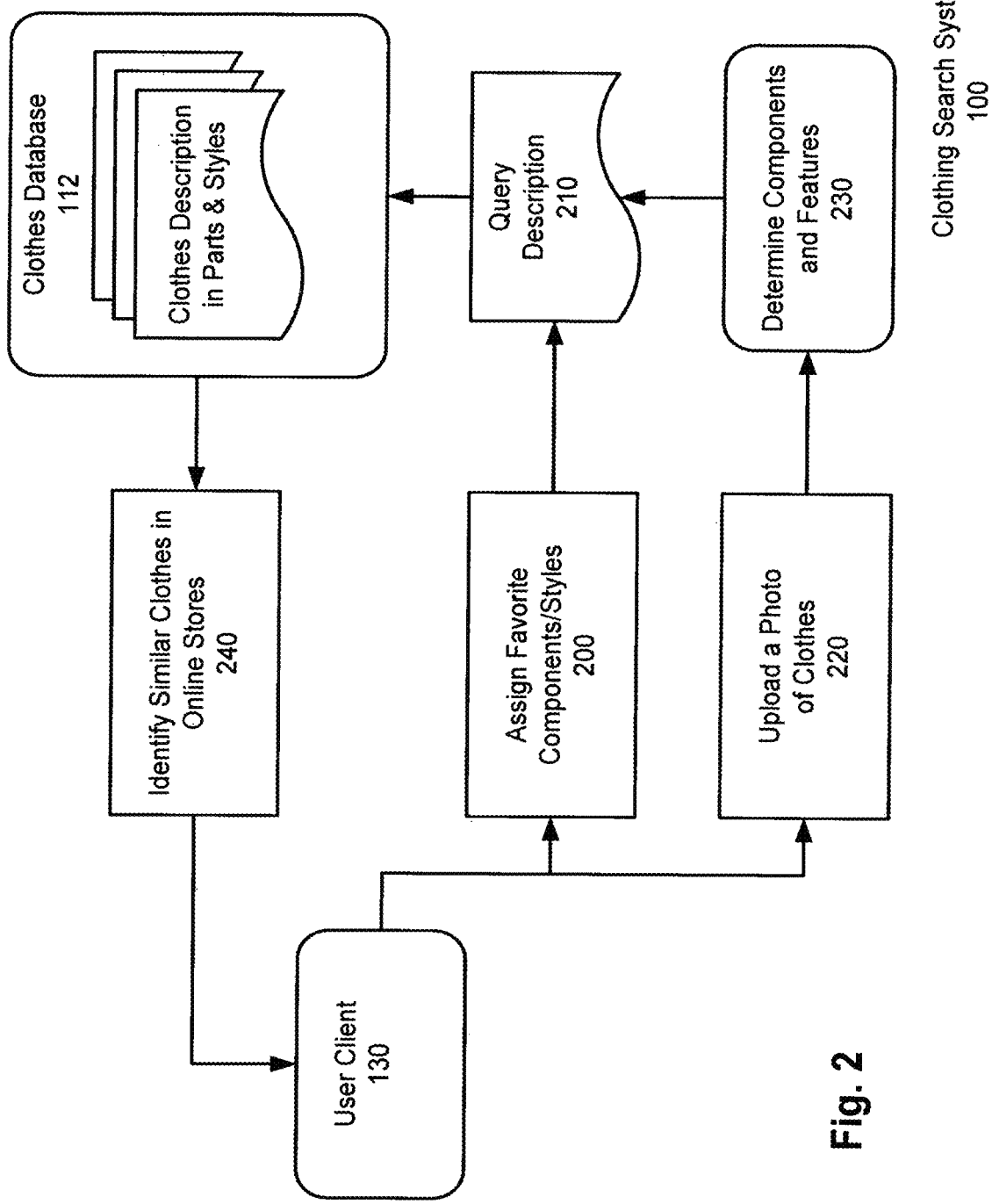
FIG. 2 is a transaction diagram showing data flow in a clothes searching system according to one embodiment.

FIG. 2 is a transaction diagram showing data flow in a clothes searching system according to one embodiment. The user client 130 initially contacts the clothing search module 102 and uploads 220 a photo or indicates particular components or styles for the clothing search module 102 to locate similar clothing. When the user search module 102 receives a photo, the user search module 102 determines the components and associated features 230 as described above. Using the components or styles indicated by the user or the components and features extracted from the photo, a search query 210 is formed. The search query is applied to the clothing database 112 and similar clothes to the query are identified 130. The similar clothes are transmitted to the user client 130 for the user to view and interact with.

Figure 3:
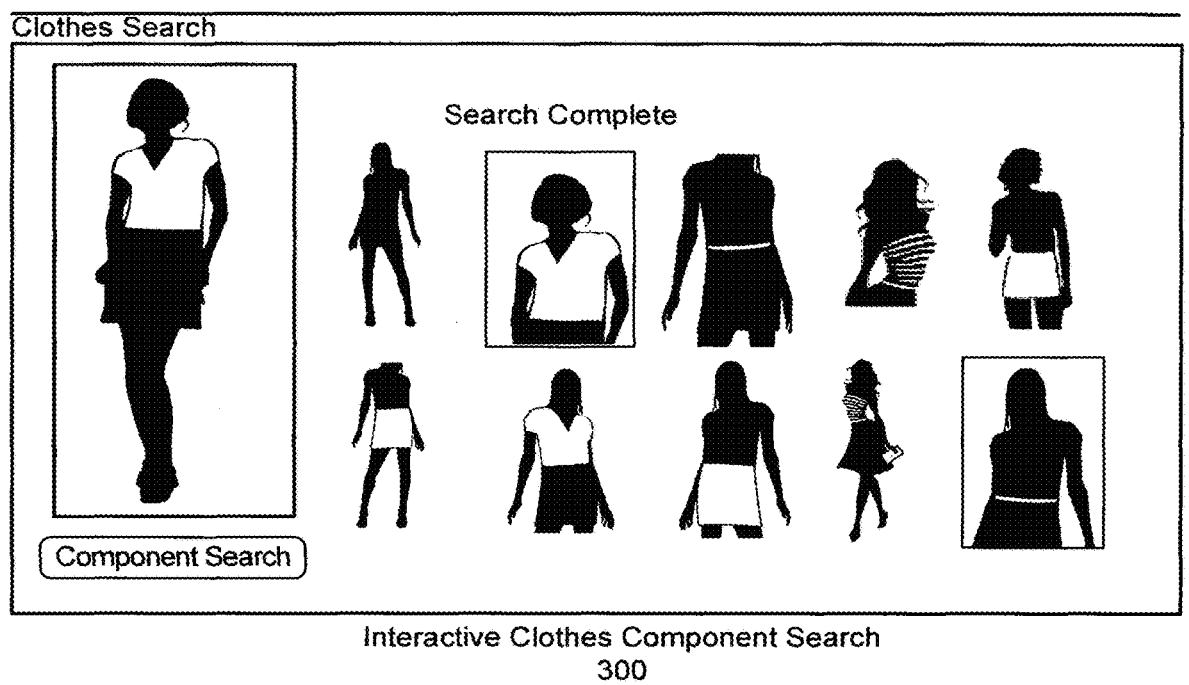
FIG. 3 is a user interface for the user client illustrating a clothing component search.

FIG. 3 is a user interface for the user client 130 illustrating a clothing component search. The imaged used for searching is selected and transmitted to the clothing search system 100. The resulting search results are provided on the user interface allowing the user to view the matching clothing and select clothes of interest. In addition, the user may select clothing to initiate a new search based on the image associated with that clothing, or the user may select a particular component of clothing to emphasize a search based on that component. When the user requests a search to emphasize a component of clothing, similarity of components in other clothes to the emphasized components is weighted higher as described above.

Figure 4:
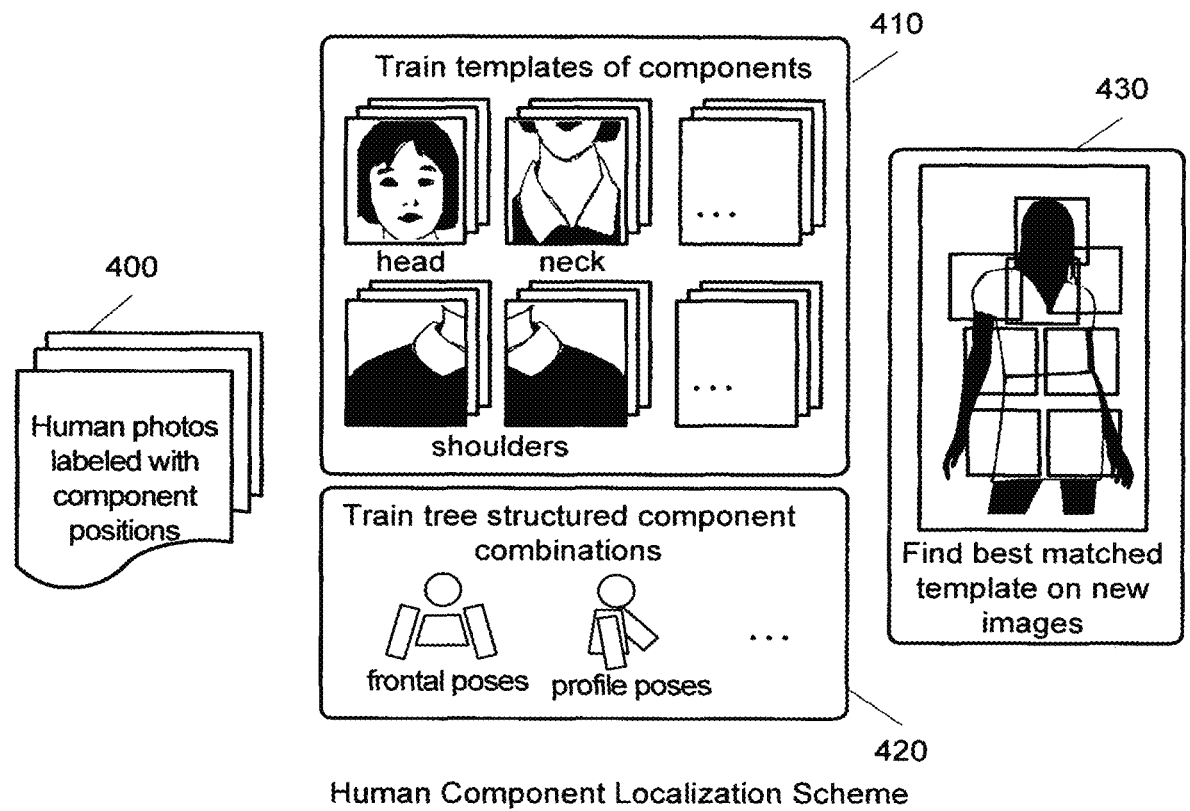
FIG. 4 is a conceptual illustration of the component template training and identification of components on a new image according to one embodiment.

FIG. 4 is a conceptual illustration of the component template training and identification of components on a new image according to one embodiment, as further described above. The training of a component template is initiated with a set of photos with labeled component positions 400. The portions of each image relating to a particular component are selected 410, and used to train the templates for identifying the components by template training module 106. A tree is trained 420 based on features of the images to detect different types of views of the same component, such as by determining different poses of the same component. In one embodiment, the features include a histogram of oriented gradients. After being trained, the component detection module 104 uses the templates to identify components on a new image 430. As shown in this figure, the components detected in an image may overlap.

Figure 5:
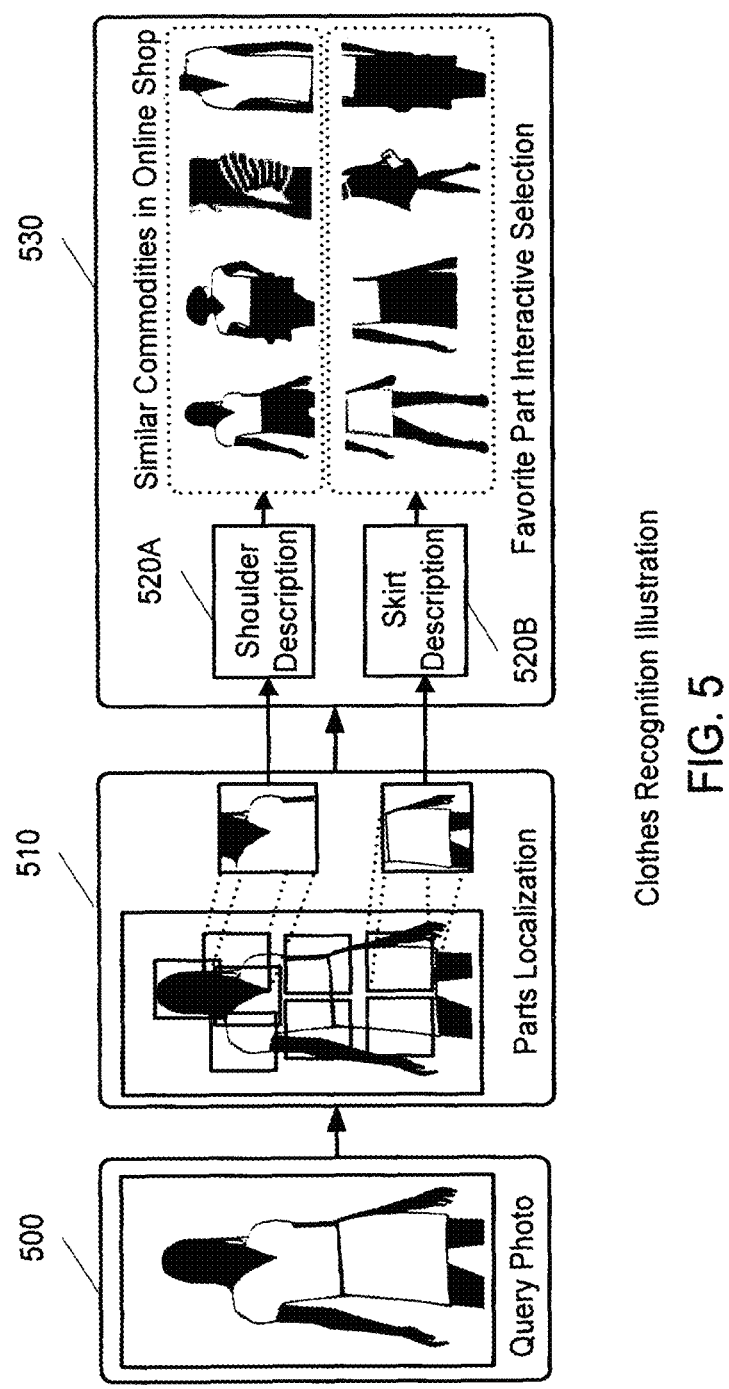
FIG. 5 shows the selection of similar clothing based on the components identified in an image according to one embodiment.

FIG. 5 shows the selection of similar clothing based on the components identified in an image according to one embodiment. Components 510 are detected in a query photo 500 as described above. A component description 520 is determined by extracting a feature vector from the components, such as a shoulder description 520A and a skirt description 520B. The components and associated feature vectors are compared against the clothes stored in clothing database 112 to determine matching clothing. The matching clothing is displayed on an interface such interface 530.

Figure 6:
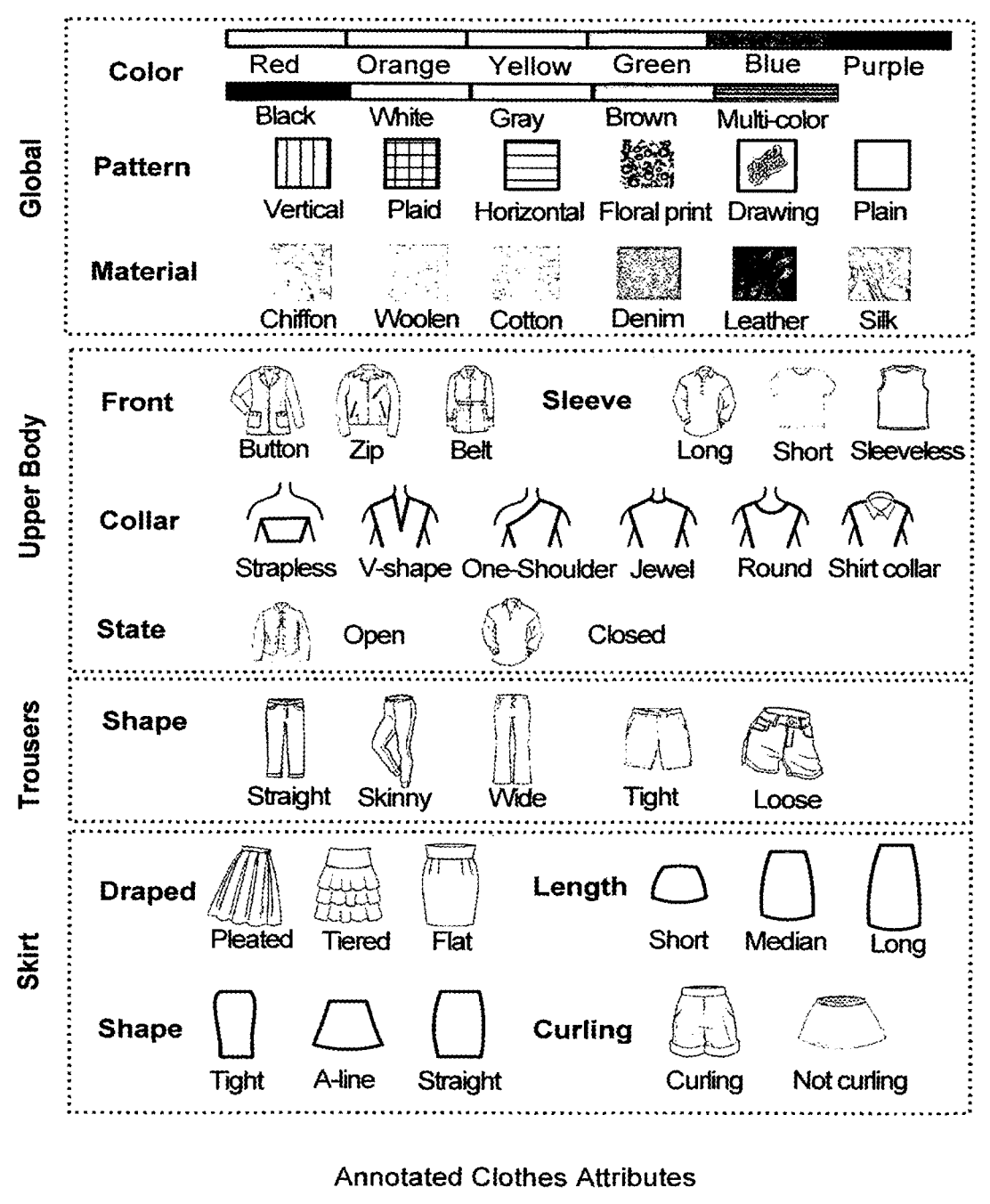

FIG. 6 illustrates annotated clothing attributes according to one embodiment. Clothing in the database 112 may be associated with various clothing attributes as shown in FIG. 6. The attributes in the clothing database may be determined based on a description at the online clothing retailer 140 or may be determined based on a classifier based on other clothing descriptions. The annotated descriptions may comprise a global description, such as a color, pattern, and material. In addition, specific portions of clothing may be described, such as the front of an upper body component or the shape of trousers, as shown. The user may also select a clothing attribute for the search to further refine selection of clothing of interest to the user.

The user interface sends user queries to the database server and downloads and displays retrieved items from the server. The favorite part/design of the query clothes can be interactively selected by the user and send to the server via the interface as well.

Accordingly, this system and method provides a more comprehensive description of the clothes design. This description can better performance in clothes similarity measurements.

The advanced clothes description of the preceding embodiments brings a new possibility in flexible fine clothes search based on components and styles, which is so-far not well investigated in previous systems.

In conclusion, our proposed clothes description provides better performance on clothes component localization by handling both pose and environment diversity, especially in the robustness of search between daily photos captured by a camera at the user and the ability to search online shopping inventory based on the image provided by a user. Such cross-dataset component-level search is not solved in aforementioned systems.

As an example use of these embodiments, a user can take a photo of any fashionably dressed lady on street with the camera and use the interface to query her clothes in the shops. One can also query web photos while browsing albums of friends on a social network.

The invented automatic clothes recognition system can also be used to clothes data mining applications. In these kinds of use, samples of desired clothes styles (e.g. winter/spring/summer clothing, costumes with local or occupation features, etc.) need to be first collected and annotated. Referring to these samples, the system can automatically produce clothes style labels to online photos. Such data mining can provide helpful statistical information on season fashion, local dressing and photo content. In social network websites, such information predicted from user uploaded photos can be used for recommendations (ads, fashion, etc).

Moreover, if also provided professional guide of clothes matching, the clothes recognition system can handle personal clothes management and matching recommendation. This application is valuable to many current digital wardrobe services.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A computer-implemented method for interactively searching clothes, the computer-implemented method comprising:
   accessing, by a search system, an image of an article of clothing from a first database of a provider of the article of clothing;
   detecting, by the search system, a component of the article of clothing by at least identifying the component from the image and matching the identified component to a component template, wherein:
      the component template corresponds to the detected component, has a tree structure, and is generated based on images of articles of clothing showing the component, and
      a branch of the tree structure corresponds to a set of common characteristics of the component as shown in the images;
   extracting, by the search system from the image, a feature corresponding to the detected component;
   updating, by the search system, a second database with information about the article of clothing, the information identifying the detected component, the extracted feature, and the provider of the article of clothing;
   receiving, by the search system, a query from a user device, the query associated with the article of clothing;
   retrieving, by the search system based on the query, the information from the second database, the retrieving comprising:
      identifying, from the query, a particular component of the article of clothing,
      matching the particular component and the detected component, identifying, from the query, a particular feature that corresponds to the particular component, and matching the particular feature and the extracted feature; and providing, by the search system to the user device in response to the query, the information about the article of clothing, wherein the component template is generated by at least:

accessing images of articles of clothing from remote databases of providers of the articles of clothing;

for each image of the images:

identifying a portion of the image that shows the component;

identifying a characteristic of the component as shown in the image; and updating the branch of the tree structure with the characteristic.

2. The computer-implemented method of claim 1, wherein the first database and the second database are local to the search system.

3. The computer-implemented method of claim 1, wherein the component template is accessed from a third database that stores component templates each corresponding to a different component of the article of clothing.

4. The computer-implemented method of claim 1, wherein the query comprises a different image received from the user device and showing the particular component.

5. The computer-implemented method of claim 4, wherein the query further indicates a weight of the particular component relative to another component shown in the different image, and wherein the particular component and the detected component are matched based on the weight.

6. The computer-implemented method of claim 4, wherein the information provided to the user device comprises a link to a website of the provider based on the matching of the particular component from the different image and the detected component from the image accessed from the first database of the provider.

7. The computer-implemented method of claim 1, further comprising:

training the search system to detect components of the articles of clothing and features of the components from the images, the training comprising:

maintaining component templates based on the images, each component template corresponding to one of the components and structured as a tree, a branch of the tree corresponding to a set of common characteristics of the one component across the images;

receiving, by the search system, a plurality of images of a plurality of articles of clothing available from the provider;

for each images of one of the plurality of articles of clothing:

automatically detecting, by the search system, a plurality of components associated with the one article of clothing by applying the component templates to the image, and automatically extracting, by the search system from the image, a plurality of features corresponding to the plurality of components.

8. The computer-implemented method of claim 7, wherein the automatically extracted plurality of features comprise:

type of the article of clothing;
color of the article of clothing;
style of the article of clothing;
location of each component of the article of clothing;
description of each component; and
design information of the article of clothing.

9. The computer-implemented method of claim 7, wherein the component templates comprise shape templates of individual human body parts, and wherein training the search system comprises:

updating the shape templates of individual human body parts based on pre-labeled training samples for human parsing; and updating tree-structured combinations of human body parts subject to pre-labeled training samples for human parsing.

10. The computer-implemented method of claim 7, further comprising:

generating annotations about common clothing styles;
storing the annotation in the second database;
evaluating the plurality of components and the plurality of features using the annotations; and
searching for common clothing styles of among the plurality of articles of clothing using the annotations.

11. A non-transitory computer-readable storage medium comprising instructions that, upon execution on a search system, configure the search system to perform operations comprising:

accessing an image of an article of clothing from a first database of a provider of the article of clothing;

detecting a component of the article of clothing by at least identifying the component from the image and matching the identified component to a component template, wherein:

the component template corresponds to the detected component, has a tree structure, and is generated based on images of articles of clothing showing the component, and a branch of the tree structure corresponds to a set of common characteristics of the component as shown in the images;

extracting, from the image, a feature corresponding to the detected component;

updating a second database with information about the clothing of article, the information identifying the detected component, the extracted feature, and the provider of the article of clothing;

receiving a query from a user device, the query associated with the article of clothing;

retrieving, by the search system based on the query, the information from the second database, the retrieving comprising:

identifying, from the query, a particular component of the article of clothing, matching the particular component and the detected component, identifying, from the query, a particular feature that corresponds to the particular component, and matching the particular feature and the extracted feature; and providing, to the user device in response to the query, the information about the article of clothing, wherein matching the component identified in the image to the component template comprises matching a shape of the component from the image to a characteristic from the branch of the tree structure in the component template.

12. The non-transitory computer-readable storage medium of claim 11, wherein the first database and the second database are local to the search system, and wherein the component template is generated by at least:

accessing images of articles of clothing from remote databases of providers of the articles of clothing;

for each image of the images:
identifying a portion of the image that shows the component;
identifying a characteristic of the component as shown in the image; and
updating the branch of the tree structure with the characteristic.

13. The non-transitory computer-readable storage medium of claim 11, wherein matching the component identified in the image to the component template comprises matching a shape of the component from the image to a characteristic from the branch of the tree structure in the component template.

14. The non-transitory computer-readable storage medium of claim 11, wherein the component template is accessed from a third database that stores component templates each corresponding to a different component of the article of clothing.

15. The non-transitory computer-readable storage medium of claim 11, wherein the query comprises a different image received from the user device and showing the particular component, wherein matching the particular feature and the extracted feature comprises computing a feature distance between the particular feature and the extracted feature, and wherein the information is retrieved from the second database based on the feature distance.

16. A search system comprising:
a processor; and
a non-transitory computer-readable storage medium comprising instructions that, upon execution by the processor, configure the search system to perform operations comprising:
accessing an image of an article of clothing from a first database of a provider of the article of clothing;
detecting a component of the article of clothing by at least identifying the component from the image and matching the identified component to a component template, wherein:
the component template corresponds to the detected component, has a tree structure, and is generated based on images of articles of clothing showing the component, and
a branch of the tree structure corresponds to a set of common characteristics of the component as shown in the images;
extracting, from the image, a feature corresponding to the detected component;
updating a second database with information about the clothing of article, the information identifying the detected component, the extracted feature, and the provider of the article of clothing;
receiving a query from a user device, the query associated with the article of clothing;
retrieving, by the search system based on the query, the information from the second database, the retrieving comprising:
identifying, from the query, a particular component of the article of clothing,
matching the particular component and the detected component,
identifying, from the query, a particular feature that corresponds to the particular component, and
matching the particular feature and the extracted feature; and
providing, to the user device in response to the query, the information about the article of clothing,
wherein matching the particular feature and the extracted feature comprises computing a feature distance between the particular feature and the extracted feature, and wherein the information is retrieved from the second database based on the feature distance.

17. The search system of claim 11, wherein the query comprises a different image received from the user device and showing the particular component, wherein matching the particular feature and the extracted feature comprises computing a feature distance between the particular feature and the extracted feature, and wherein the information is retrieved from the second database based on the feature distance.

18. The search system of claim 17, wherein the query further indicates a weight of the particular component relative to another component shown in the different image, and wherein the particular component and the detected component are matched based on the weight.

19. The search system of claim 17, wherein the information provided to the user device comprises a link to a website of the provider based on the matching of the particular component from the different image and the detected component from the image accessed from the first database of the provider.

* * * * *